United States Patent
Van Gaasbeck et al.

(10) Patent No.: US 6,687,762 B1
(45) Date of Patent: Feb. 3, 2004

(54) NETWORK OPERATING SYSTEM ADAPTED FOR SIMULTANEOUS USE BY DIFFERENT OPERATING SYSTEMS

(75) Inventors: Richard Henry Van Gaasbeck, Mountain View, CA (US); Shyam Pillalamarri, Palo Alto, CA (US); Slawomir Ilnicki, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1227 days.

(21) Appl. No.: 08/728,422

(22) Filed: Oct. 10, 1996

(51) Int. Cl.[7] .................... G06F 9/44; G06F 9/455; G06F 15/16
(52) U.S. Cl. .................... 709/319; 709/330; 717/138
(58) Field of Search ............... 395/200.33, 200.57, 395/200.52, 187.01; 364/280, 242.94, 240.8, 284.4

(56) References Cited

U.S. PATENT DOCUMENTS

| | | | | |
|---|---|---|---|---|
| 5,471,622 A | * | 11/1995 | Eadline | 395/650 |
| 5,555,375 A | * | 9/1996 | Sudama et al. | 395/200.03 |
| 5,634,010 A | * | 5/1997 | Ciscon et al. | 395/200.15 |
| 5,636,371 A | * | 6/1997 | Yu | 395/500 |
| 5,682,478 A | * | 10/1997 | Watson et al. | 395/200.12 |
| 5,682,534 A | * | 10/1997 | Kapoor et al. | 395/684 |
| 5,687,373 A | * | 11/1997 | Holmes et al. | 395/682 |
| 5,764,984 A | * | 6/1998 | Loucks | 395/682 |
| 5,812,768 A | * | 9/1998 | Pageet et al. | 395/200.09 |

* cited by examiner

Primary Examiner—Dung C. Dinh

(57) ABSTRACT

An operating environment for use on a computer system to provide operating system services to a user application running on the computer system. The computer system includes a network connecting the computer system to at least one other computer system. The user application generates operating system commands requiring access to the network, and commands requiring operating system actions that do not access the network. An operating environment according to the present invention includes a network server for accessing the network, a non-network server for executing operating system commands not requiring network services, and an emulation library for receiving the operating system commands generated by the user application. The emulation library decodes each of the received operating system commands to determine if that command requires network services, and forwards a command based on that received command to the non-network server or the network server depending on whether or not that command requires network services. The emulation library shares the same task as the user application and acts as a proxy for the operating system. The network server includes the translation routines for translating operating system commands to commands for one or more network protocol stacks.

6 Claims, 4 Drawing Sheets

NETWORK OPERATING SYSTEM ADAPTED FOR SIMULTANEOUS USE BY DIFFERENT OPERATING SYSTEMS

FIELD OF THE INVENTION

The present invention relates to computer operating systems, and more particularly, to an improved networking environment which allows multiple operating systems to access a network server.

BACKGROUND OF THE INVENTION

Individual computer workstations are often networked so as to provide resources that may be shared by the individual workstations and to provide communication between the workstations. Communications between computers is usually accomplished by implementing a stack of protocol modules in which the lowest levels provide the most primitive functions and higher order functions are built by higher layers to provide the type of service typically needed by the applications.

In prior art systems, the protocol stack used for networking is part of the operating system. Hence, changes in the operating system have an immediate impact on the protocol modules in the network stack. To prevent a totally adhoc approach to the networking interfaces, network protocol frameworks have been implemented in some systems. A framework provides standard interfaces between the various components in a network stack. Inter-protocol interfaces are defined for each framework. These interfaces provide the communication protocols used between modules and the operating system, the modules, and the network devices and between the protocol modules and the application programming interface(API).

While the framework approach avoids many of the problems inherent in the adhoc approach, the framework approach still has several disadvantages. First, there is no single framework. Hence, the problem of different protocols is only reduced, not eliminated. Second, current frameworks imperfectly hide differences in operating systems. The framework interfaces are not specified with sufficient detail to prevent independently developed implementations of a framework, or the same framework code ported to a different operating system from behaving differently. As a result, protocol modules which work in some framework implementations do not necessarily work in other implementations of the same framework.

Another problem inherent in prior art network servers is dependence of the network server on the operation system. This often leads to the need to alter the network server when other aspects of the operating system are altered.

Further, there are a number of hardware platforms, operating systems, and network protocol suites. The lack of independence leads to a significant maintenance problem for systems that must be maintained for multiple operating systems and hardware platforms.

Broadly, it is the object of the present invention to provide an improved network system.

It is a further object of the present invention to provide a network system that is more independent of the operating system than prior art network servers.

It is a still further object of the present invention to provide a network server that can service multiple operating systems operating on the same platform.

These and other objects of the present invention will become apparent to those skilled in the art from the following detailed description of the invention and the accompanying drawings.

SUMMARY OF THE INVENTION

The present invention is an operating environment for use on a computer system to provide operating system services to a user application running on the computer system. The computer system includes a network connecting the computer system to at least one other computer system. The user application generates operating system commands requiring access to the network, and commands requiring operating system actions that do not access the network. An operating environment according to the present invention includes a network server for accessing the network, a non-network server for executing operating system commands not requiring network services, and an emulation library for receiving the operating system commands generated by the user application. The emulation library decodes each of the received operating system commands to determine if that command requires network services, and forwards a command based on that received command to the non-network server or the network server depending on whether or not that command requires network services. The emulation library shares the same task as the user application and acts as a proxy for the operating system. The network server includes a first translation routine for translating operating system commands to commands for a first network protocol stack. In network servers that support two operating systems, the network server also includes a second translation routine for translating operating system commands from second operating system to commands for said network protocol stack. A network server according to the present invention can also support multiple protocol stacks by altering the translation routines to decode commands for all stacks and including the additional protocol stacks in the network server.

BRIEF DESCRIPTION OF SAID DRAWINGS

DETAILED DESCRIPTION OF SAID INVENTION

Figure 1:
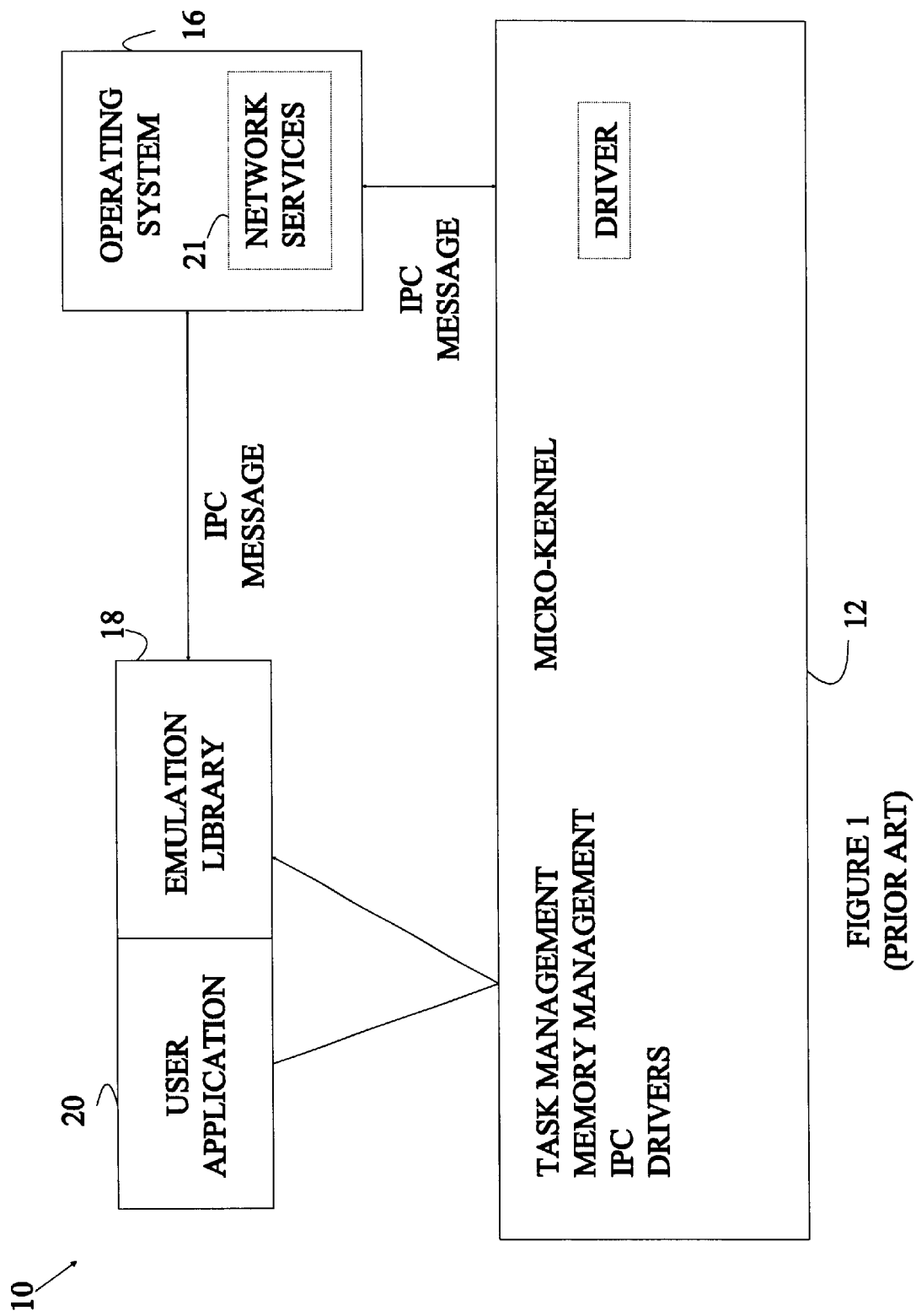
FIG. 1 is a block diagram of a micro-kernel based operating system.

The present invention is based on a "micro-kernel" approach to the networking implementation. The present invention may be more easily understood with reference to FIG. 1 which illustrates the basic concept of a micro-kernel based system 10. The micro-kernel based system 10 includes a micro-kernel 12, a single server operating system 16, and an Emulation Library 18.

The micro-kernel 12 performs the most basic and hardware specific functions. It exports a well known virtual machine abstraction upon which a traditional operating system is layered. The basic functions performed by the micro-kernel are task management, management of physical resources through drivers, memory management, and task to task communication (IPC). The traditional single server operating system 16 provides operating system services such as file systems, process management and networking.

The Emulation Library 18 is a part of the same task as the application 20 and behaves like a proxy for the operating system inside of the application. The Emulation Library shares the same address space as the application.

The manner in which these components interact can be more easily understood by following a system call from a UNIX application. The application performs a system call which generates a trap that is processed by the micro-kernel. The micro-kernel redirects the trap to the appropriate function in the emulation library. As part of the emulation library startup, special function handlers are registered with the micro-kernel for the various system calls. The emulation library function transforms the system call into an IPC message and sends the message to the operating system server for service. The operating system server responds with a reply message which causes the emulation library to copy the returned values and to return to the user application via the micro-kernel. The emulation library insulates the user application from the OS implementation, and hence, the application is not aware of the details of the implementation of operating system.

In most prior art micro-kernel based operating systems, the network protocol stack 21 is included in the operating system 16. As a result, the non-network and network service functionalities are closely coupled resulting in the problems discussed above.

Figure 2:
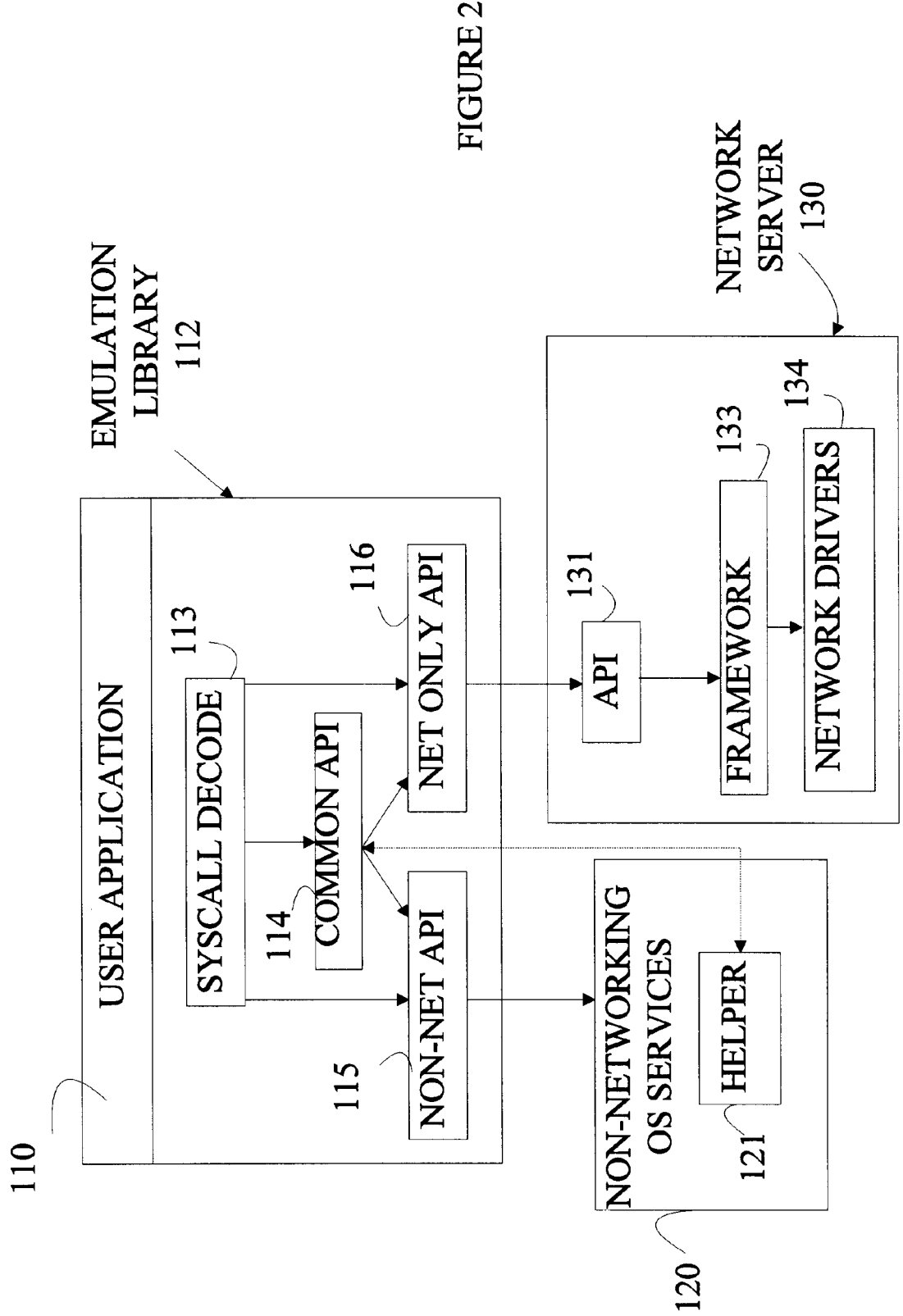
FIG. 2 is a block diagram of an operating system according to one embodiment of said present invention.

The present invention may be more easily understood with reference to FIG. 2 which is a block diagram of a user application 110 running under an operating system according to the present invention. In an operating system according to the present invention, the network services are separated out of the traditional operating system and placed in a separate network server 130. The remaining network services are moved to a non-networking services server 120. User application 110 communicates with emulation library 112 which includes a system call decode module 113 which intercepts the various system calls generated by application 110. The system calls are initially separated into three types by decode module 113, those that require network services, those that do not require network services, and those that may require network services. The system calls that do not require network services are forwarded to a Non-network API 115 which converts these calls to a format understood by operating system module 120 which handles non-network related operating system tasks.

The system calls that may require network services are forwarded to module 114 which makes the determination as to whether network services are required. To aid module 114 in making this determination, operating system module 120 provides a "helper" module 121 which resolves the type of service required. For example, a system call for opening a file may be directed to a local file on the work station or to a file on a network server. Decode module 113 only knows the path name associated with the file. To determine if this path name is a local or network drive, module 114 queries helper module 121 which checks to see if the drive is a local drive. This information is returned to module 114 which uses it to direct the call to the appropriate module. It should be noted that some tasks may require both network and non-network services. In this case, module 114 divides the task into sub-tasks requiring the different types of services and forwards each sub-task to appropriate API handler.

Those system calls that require network services are forwarded to module 116 which forwards the API call to network server 130. Network server 130 includes an API 131 module for receiving commands requiring network services. These commands are preferably translated to a form understood by a framework 133 which interfaces with network drivers 134 providing the interface with the network hardware. In the preferred embodiment of the present invention, the framework is a commercially available framework. API module 131 provides any translation needed between the machine abstraction implemented by module 131 and the particular framework chosen. For example, Unix based systems use a number of different abstractions or "models" such as "sockets" or TLI. API module 131 translates the model used in emulation library 112 to a framework which maps the model to the network drivers that make the interface to a particular hardware implementation.

By separating the network services into a separate server, the present invention provides a networking system that is more independent of the operating system. Changes to the non-networking services module 120 have little or no impact on the network server. Similarly, the API module 131 can export a standard machine abstraction that does not need to be altered each time the operating system is modified.

Figure 3:
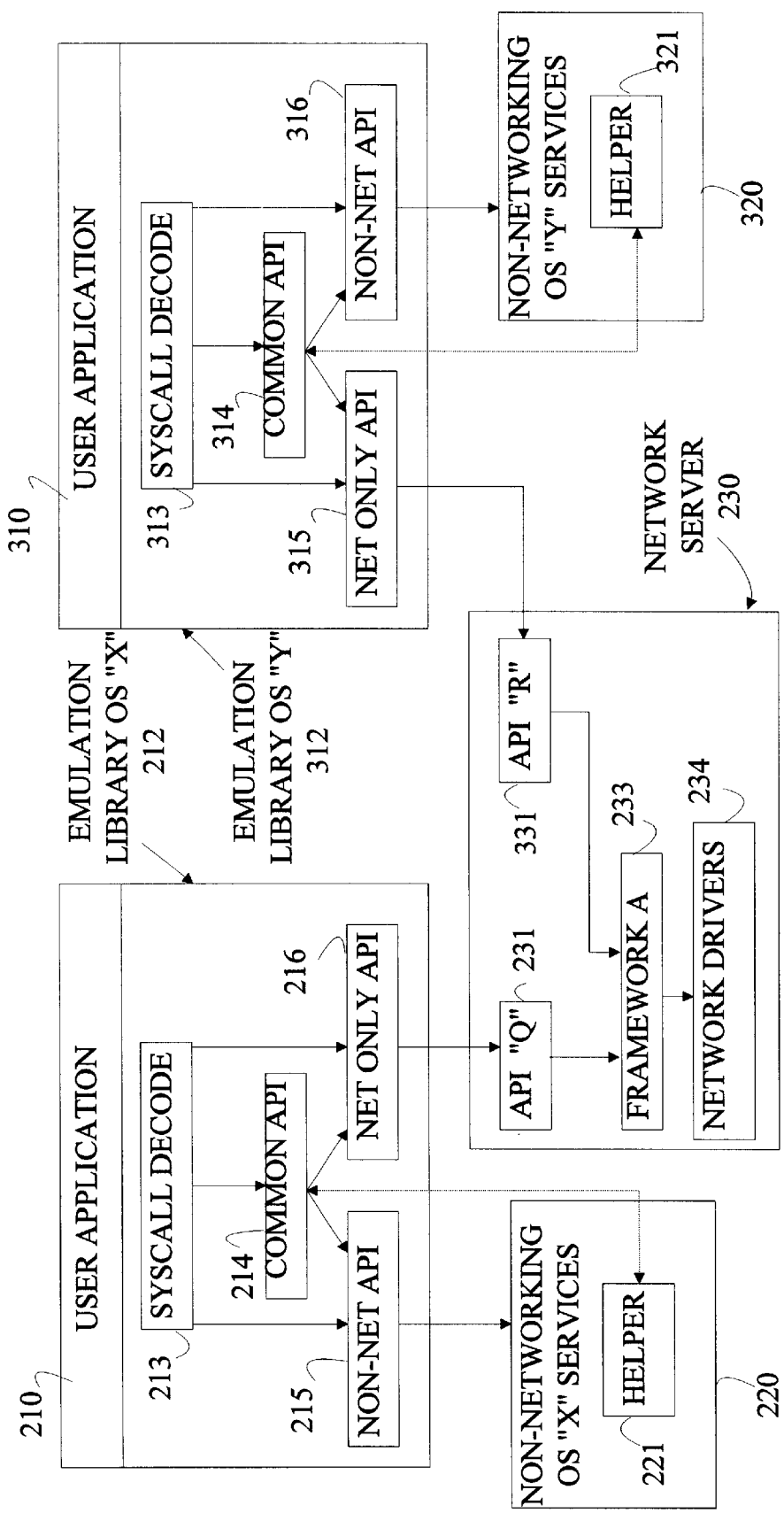
FIG. 3 is a block diagram of an operating system according to a second embodiment of said present invention which provides network services to two different operating systems.

A network server according to the present invention can serve multiple operating systems with relatively minor changes. Refer now to FIG. 3 which is a block diagram of a computer system having two operating systems, denoted by "X" and "Y", that share the same network server. An application 210 running under operating system X interacts with an emulation library 212 which is written for operating system X and contains components analogous to those described above with respect to emulation library 112. Those modules that serve analogous functions to modules discussed above have been numbered with numbers that differ by 100 from the numbers used for those modules in FIG. 2, and will not be discussed further here. Operating system X is analogous to the single operating system discussed with respect to FIG. 2.

Similarly an application 310 running under operating system Y interacts with an emulation library 312 which is written for operating system Y and contains components analogous to those described above with respect to emulation library 112. Those modules that serve analogous functions to modules discussed above have been numbered with numbers that differ by 200 from the numbers used for those modules in FIG. 2, and will not be discussed further here.

In general, the second operating system may require a different machine abstraction from the networking server. In addition, the networking server must keep the calls from the two operating systems separate. Hence, network server 230 differs from network server 130 shown in FIG. 2 in that it has one API module for each operating system. The API modules servicing operating systems X and Y are shown at 231 and 331, respectively. These API modules implement two different networking models, denoted by Q and R. In the example shown in FIG. 3, operating system X uses model Q for its network interactions, and operating system Y uses model R.

It should be noted that a third OS, "Z", could use one of the existing APIs, Q or R, thereby eliminating the need to make changes in the network server. Hence, the network server can service any OS that utilizes one of the existing APIs currently implemented in the server. This advantage is achieved results from the fact that support for a new operating system does not involve changes in the network server other than the addition of the API module for servicing the calls from the second operating system. Furthermore, changes are not required in the helper routine or emulation library for the other operating systems. Hence, the present invention provides an efficient system for implementing and maintaining a networking system that can service multiple operating systems.

Figure 4:
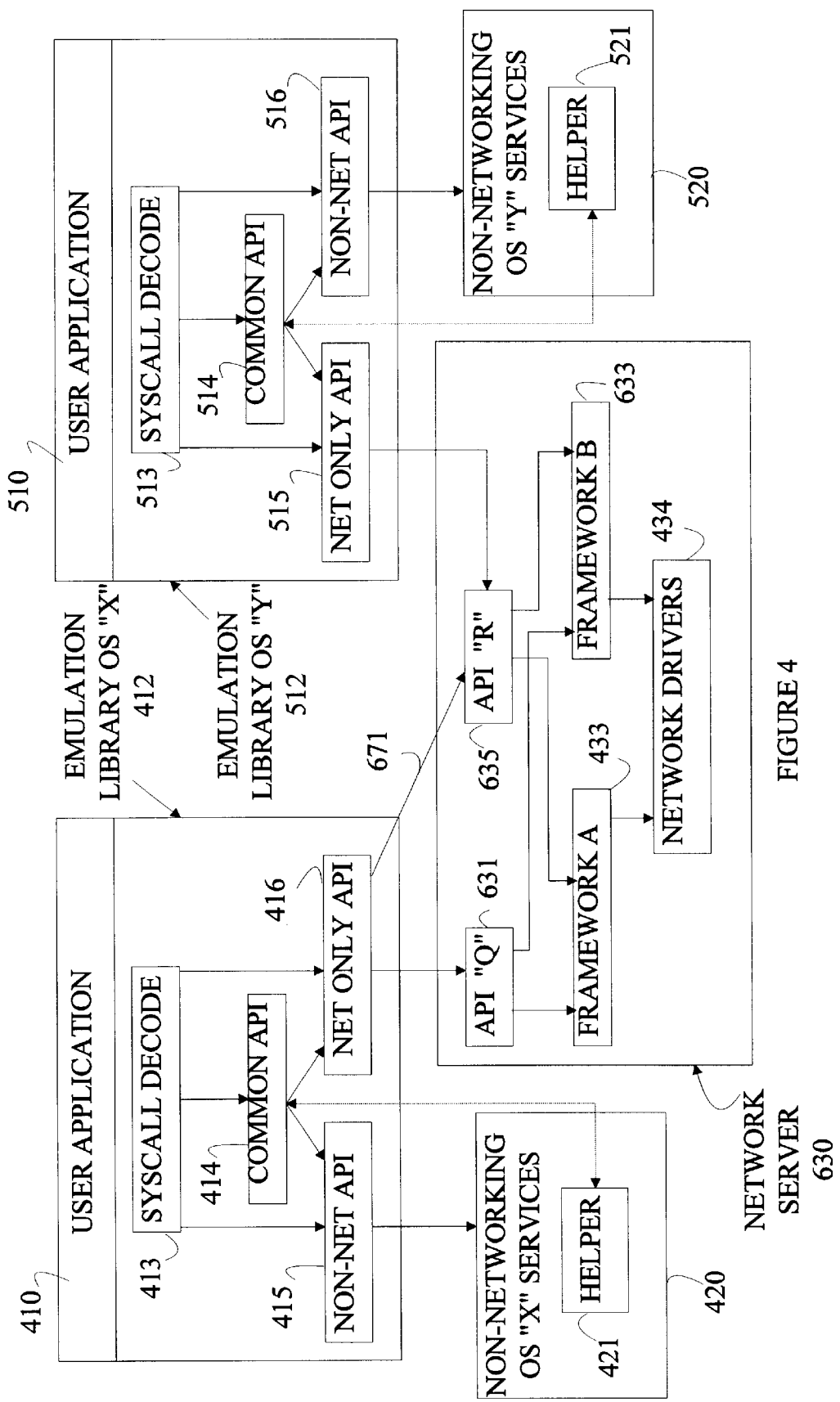
FIG. 4 is a block diagram of an operating system according to a third embodiment of said present invention which supports multiple frameworks as well as multiple operating systems.

In addition to providing an efficient system for servicing multiple operating systems, a networking system according to the present invention can also utilize multiple frameworks thereby providing capabilities that are not available in any single commercially available framework. Refer now to FIG. 4 which is block diagram of a computer operating system according to the present invention which supports two operating systems and two frameworks, 433 and 633. To simplify the following discussion, those elements that serve the same function in FIG. 4 as an analogous element in FIG. 3 are numbered with numbers that differ by 200 from the numbers shown in FIG. 3. These elements will not be discussed further here unless their functions differ in some manner from that discussed above.

To accommodate the second framework 633 so that it is available from either operating environment, API modules 631 and 635 have been modified from the analogous modules shown in FIG. 3 such that each API module exports a model that includes the calls that allows the application connected thereto to use the alternate framework. API module 631 implements at least one API call that is serviced by framework B shown at 633. Similarly, API module 635 implements at least one API call that is serviced by framework A shown at 433. In principle, the present invention also allows each of the emulation libraries to use both network models Q and R. Consider an implementation in which emulation library 412 implements calls to both models. In this case, module 416 would refer calls related to model R to API module 635 instead of API module 631 as shown at 671. Similarly, emulation library 512 could implement calls from different models by referring those calls to API module 631. Such calls have been omitted to simplify the drawing.

It will be appreciated from the preceding discussion that the division of the operating system into a non-network server and a network server results in an efficient environment for maintaining the network functions independent of the non-network functions. In addition, this environment is well adapted for "inserting" commercially available frameworks. The interface code for these modules is limited to a few well defined locations in the system, and hence, the changes required by the insertion of a new framework are straight forward and easily maintained.

Various modifications to the present invention will become apparent to those skilled in the art from the foregoing description and accompanying drawings. Accordingly, the present invention is to be limited solely by the scope of the following claims.

What is claimed is:

1. A method for operating a computer system to provide operating system services to a user application running on said computer system including a network connecting said computer system to at least one other computer system, said user application generating operating system commands requiring access to said network, commands requiring operating system actions that do not access said network, said method comprising providing an operating system including:

a network server for accessing said network;

a non-network server for executing operating system commands not requiring network services;

an emulation library, separate from said network server and said non-network server, for receiving said operating system commands generated by said user application, for decoding each of said received operating system commands to determine if that command requires network services, and forwarding a command based on that received command to said non-network server or said network server depending on whether or not that command requires network services.

2. The method of claim 1 wherein said emulation library shares the same task as said user application.

3. The method of claim 1 wherein said non-network server further comprises code for determining if an operating system command is directed to a device on said network, said code communicating with said emulation library to aid said emulation library in determining if one of said operating system commands requires access to said network.

4. The method of claim 1 wherein said network server comprises a first translation routine for translating operating system commands to commands for a first network protocol stack.

5. The method of claim 4 wherein said network server further comprises a second translation routine for translating operating system commands using a different network API to commands for said first network protocol stack.

6. The method of claim 5 wherein said network server further comprises a second network protocol stack implementing at least one operation that is different from the operations implemented from said first protocol stack, and wherein said first translation routine includes code for translating and directing commands to said second network protocol stack.

* * * * *